(12) United States Patent
Shin et al.

(10) Patent No.: US 7,614,566 B2
(45) Date of Patent: Nov. 10, 2009

(54) SMART CARDS AND SMART CARD SYSTEMS SUPPORTING MULTIPLE INTERFACES

(75) Inventors: Jong-Hoon Shin, Gyeonggi-do (KR); Seong-Hyun Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 252 days.

(21) Appl. No.: 11/699,808

(22) Filed: Jan. 30, 2007

(65) Prior Publication Data

US 2007/0194134 A1 Aug. 23, 2007

(30) Foreign Application Priority Data

Feb. 23, 2006 (KR) ...................... 10-2006-0017717

(51) Int. Cl.
*G06K 19/06* (2006.01)
(52) U.S. Cl. .................. 235/492; 235/441; 235/451; 710/14; 710/105; 361/737; 361/738
(58) Field of Classification Search ................. 235/441, 235/451, 492, 487, 493; 361/737, 738, 760; 710/14, 105
See application file for complete search history.

(56) References Cited

U.S. PATENT DOCUMENTS

| 6,168,077 B1 * | 1/2001 | Gray et al. ................... 235/375 |
| 6,439,464 B1 * | 8/2002 | Fruhauf et al. ............... 235/492 |
| 6,817,534 B2 | 11/2004 | Gray |
| 6,840,454 B1 * | 1/2005 | Rhelimi ...................... 235/492 |
| 6,883,715 B1 * | 4/2005 | Fruhauf et al. ............... 235/492 |
| 2004/0070952 A1 * | 4/2004 | Higuchi et al. ............... 361/737 |
| 2006/0000917 A1 * | 1/2006 | Kim et al. .................... 235/492 |

FOREIGN PATENT DOCUMENTS

| JP | 2004-348235 | 12/2004 |
| KR | 10-2004-0044751 | 5/2004 |

* cited by examiner

*Primary Examiner*—Seung H Lee
*Assistant Examiner*—Christle I Marshall
(74) *Attorney, Agent, or Firm*—Myers Bigel Sibley & Sajovec

(57) ABSTRACT

A smart card includes a first interface configured to perform a first type interfacing operation with a host using a plurality of contact pads defined by a contact type smart card protocol, a second interface configured to perform a second type interfacing operation with the host using a subset of the plurality of contact pads, and a controller configured to determine a priority between the first and second interfaces.

15 Claims, 5 Drawing Sheets

Fig. 5 ions specified in the ISO 7816 protocol for contact type smart cards, eight contact pads C1 to C8 are provided for a SIM card. The functions of the contact pads C1 to C8 are shown in Table 1 below.

SMART CARDS AND SMART CARD SYSTEMS SUPPORTING MULTIPLE INTERFACES

CROSS-REFERENCE TO RELATED APPLICATION

This U.S. non-provisional patent application claims priority under 35 U.S.C. § 119 to Korean Patent Application No. 10-2006-017717, filed on Feb. 23, 2006, the disclosure of which is hereby incorporated by reference.

FIELD OF THE INVENTION

The present invention disclosed herein relates to smart cards, and more particularly, to interfaces for smart cards.

BACKGROUND

A smart card contains an integrated-circuit chip (IC chip) having one or more components, such as a microprocessor, a card operating system, a security module, and/or a memory, so as to allow the holder to perform certain operations. A smart card may provide calculation, encryption, bidirectional communication, and/or security functions, and may be convenient to carry. For these and other reasons, various smart cards are used in a diverse range of applications such as traffic, medical and heath, identification, distribution, and/or civil applications.

Smart cards are classified into contact type cards, non-contact type cards, and combinations thereof (i.e., combination or hybrid type cards) based on the interface method of the card. A contact type smart card should be inserted into a reader to use it. That is, the contact type card can receives electricity and a clock signal for its operation via physical contact. Some card readers for a contact type smart card hold an inserted card so as to prevent the card from being removed before the end of communication between the reader and the card. A large amount of data can be transmitted to or from a contact type smart card as compared with the case of a non-contact type smart card. The ISO/IEC 7816 protocol is provided for contact type smart cards. In contrast, a non-contact type smart card can communicate with a reader at a distance from the reader. Thus, it may not be necessary to insert a non-contact type smart card into a reader to use the card. Protocols such as ISO/IEC 10536 and ISO/IEC 14443 are provided for non-contact type cards.

One example of a contact type smart card is a subscriber identification module (SIM) card used in a cellular phone, such as a cellular phone configured for use with a GSM (Global System for Mobile communications) communication system. A SIM card is a module that provides information about a particular user based on the name and password of the user. Since a SIM card contains information about its user, the user can, for example, use another person's cellular phone as the user's own by inserting the SIM card into the other person's cellular phone (in which case, the bill would be issued to the user associated with the SIM card).

According to the interface regulations specified in the ISO 7816 protocol for contact type smart cards, eight contact pads C1 to C8 are provided for a SIM card. The functions of the contact pads C1 to C8 are shown in Table 1 below.

TABLE 1

| PIN # | ASSIGNMENT (ISO 7816) |
|---|---|
| C1 | VDD (SUPPLY VOLTAGE) |
| C2 | RST (RESET SIGNAL) |
| C3 | CLK (CLOCK SIGNAL) |
| C4 | RESERVE |
| C5 | VSS (GROUND) |
| C6 | VPP (PROGRAMMING VOLTAGE) |
| C7 | I/O (DATA INPUT/OUTPUT) |
| C8 | RESERVE |

Referring to Table 1, the contact pad C1 is used to receive power through an outside interface for the SIM card. The contact pad C2 is used to receive a reset signal for resetting an internal circuit of the SIM card. The contact pad C3 is used to receive a clock signal from an outside interface. The clock signal may be used for operating a microprocessor embedded in the SIM card. The contact pad C5 is used as an electrical ground between the SIM card and an outer interface. The contact pad C6 is used as a power supply pin for supplying a programming voltage (VPP) to an electrically erasable programmable read only memory (EEPROM) embedded in the SIM card. The contact pad C7 is used for data communication between the SIM card and an outside interface by a half-duplex communication scheme. Meanwhile, the contact pads C4 and C8 are reserved pads that are not yet specified in the ISO 7816 protocol.

According to the ISO 7816 protocol, 9600-bps, 19200-bps, and 38400-bps transmission rates are allowed. Therefore, the ISO 7816 protocol is usually used for applications requiring a low communication bandwidth, such as automated teller machines (ATMs) and visitor identification certificating devices. However, as electronic commerce technologies using the Internet and cellular phones are developed, and transmission of large data such as audio and video files are increasingly demanded.

Therefore, to provide an increased variety of services using a smart card, more contact pads may be added to the smart card, and/or an additional chip may be embedded in the smart card. However, as described above, the number and functions of the contact pads C1 to C8 are already defined for SIM cards.

SUMMARY

Embodiments of the invention provide a smart card including a plurality of interfaces. A smart card according to some embodiments of the invention includes a first interface configured to perform a first type interfacing operation with a host using a plurality of contact pads defined by a contact type smart card protocol, a second interface configured to perform a second type interfacing operation with the host using a subset of the plurality of contact pads, and a controller configured to determine a priority between the first and second interfaces.

The first interface may include an ISO 7816 interface. The second interface may include an interface for one of an MMC (multi media card), an SD (secure digital) card, a memory stick, a compact flash memory, an xD card, an SM (smart media), and/or a USB (universal serial bus) device.

The subset of contact pads may include a reserve contact pad C4, a high-voltage contact pad C6 for programming, and a reserve pad C8 that are defined at the ISO 7816 interface. The host may include a pad setting circuit configured to set functions of the contact pads C4, C6, and C8 for the second interface. The pad setting circuit may include a pull-up/pull-down circuit connecting the respective contact pads C4, C6, and C8 to a power voltage and/or a ground voltage.

The second interface may include a pad detecting circuit configured to detect pull-up/pull-down states of the respective contact pads C4, C6, and C8.

The controller may include a multi function bus selector configured to determine a type of the second interface using the detected pull-in/pull-down states of the contact pads C4, C6, and C8. The multi function bus selector may be configured to recognize the second interface as an MMC interface when both the contact pads C4 and C8 are in a pull-up state, and/or to recognize the second interface as a USB interface when all the contact pads C4, C6, and C8 are in a pull-down state.

The smart card may further include a memory module configured to store data transmitted through the first and/or second interfaces. The controller may be configured to determine a priority between the first and second interfaces for access to the memory module.

A smart card system according to some embodiments of the invention includes a portable device including a first host and a second host, and a smart card connecting to the portable device through a plurality of contact pads defined by a contact type smart card protocol. The smart card may further include a first interface configured to perform a first type interfacing operation with the first host using the contact pads, a second interface configured to perform a second type interfacing operation with the second host using a subset of the contact pads, and a controller configured to determine a priority between the first and second interfaces.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF EMBODIMENTS OF THE INVENTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

A smart card according to some embodiments of the present invention includes a first interface performing a first type interface with a host using a plurality of contact pads defined by a protocol for contact type smart cards, a second interface performing a second type interface with the host using at least three of the plurality of contact pads, and a controller determining the priority between the first and second type interfaces. With this configuration, the smart card can have various functions without additional contact pads.

Figure 1:
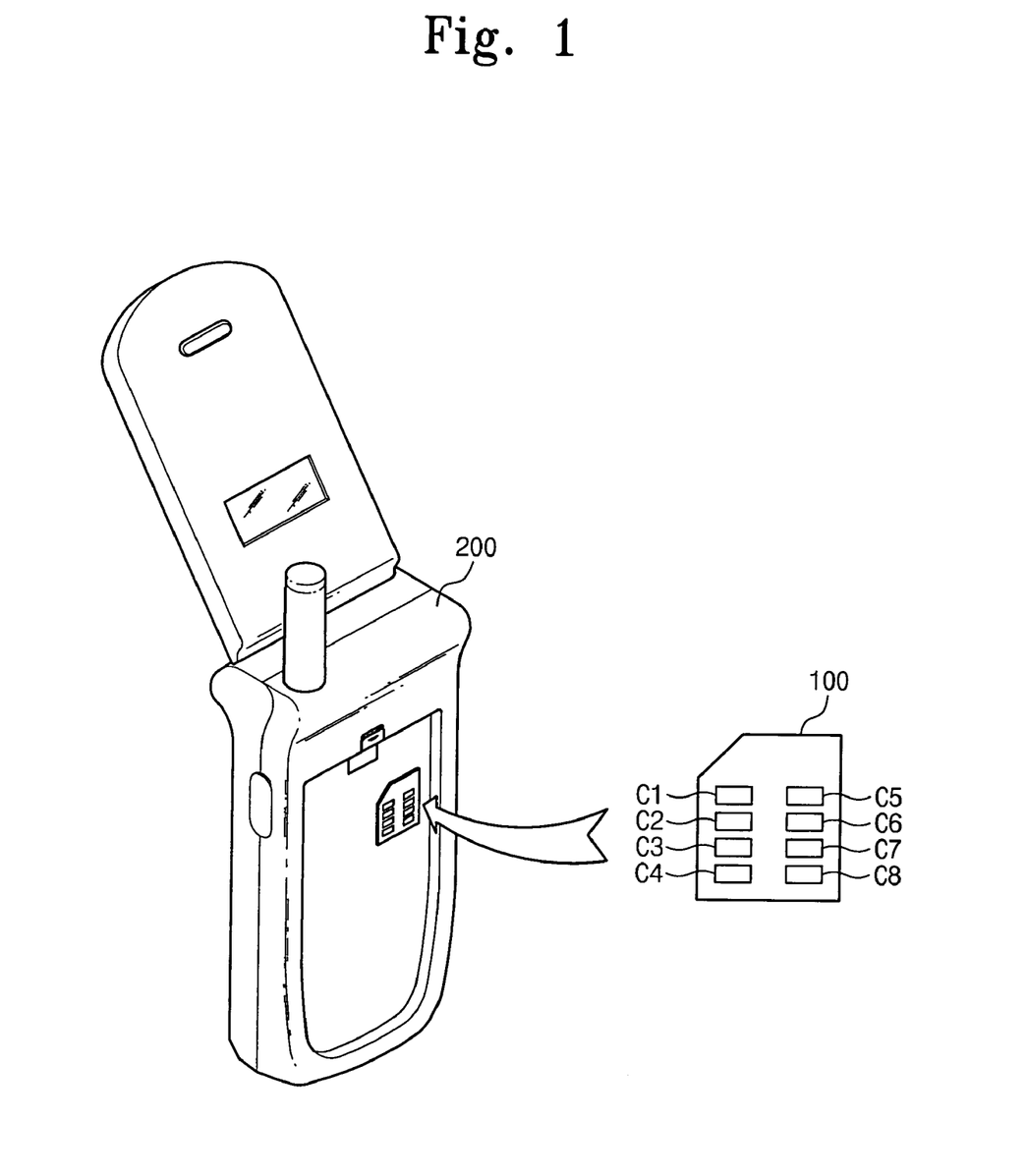
FIG. 1 is a diagram illustrating a subscriber identification module (SIM) card and a portable device using the SIM card according to some embodiments of the invention.

FIG. 1 is a diagram illustrating a subscriber identification module (SIM) card 100 and a portable device 200 using the SIM card 100 according to some embodiments of the present invention. In some embodiments, the portable device 200 may be a cellular phone. However, the present invention is not limited to cellular phones or to smart cards for use with cellular phones. That is, some embodiments of the present invention can be applied to various portable devices, such as personal digital assistants (PDAs), personal multimedia players (PMPs), digital cameras, and personal video recorders (PVRs).

Referring to FIG. 1, the SIM card 100 can be mounted on a SIM card socket provided in the portable device 200. The SIM card socket holds the SIM card 100 securely in place and makes physical contact with a plurality of contact pads C1 through C8 on the SIM card 100 so as to provide power and/or clock signals to the SIM card 100. The shape and location of the SIM card socket can vary.

The SIM card 100 is configured to perform both ISO 7816 interface functions and multi function interface functions using the contact pads C1 to C8 in accordance with the ISO 7816 protocol (or other contact type smart card protocol). In some embodiments, the multi function interface may include interfaces for a multi media card (MMC), a secure digital (SD) card, a memory stick, a compact flash memory, an xD card, a smart media (SM) card, and/or a universal serial bus (USB). Functions of the contact pads C1 through C8 defined in some embodiments are shown in Table 2 below.

TABLE 2

| PIN # ASSIGNMENT (ISO 7816) | PIN # ASSIGNMENT (MMC, USB) |
|---|---|
| C1 VDD (SUPPLY VOLTAGE) | C1 VDD (SUPPLY VOLTAGE) |
| C2 RST (RESET SIGNAL) | C2 RST (RESET SIGNAL) |
| C3 CLK (CLOCK SIGNAL) | C3 CLK (CLOCK SIGNAL) |
| C4 RESERVE | C4 MDATA0, D+ (Multi Function Interface) |
| C5 VSS (GROUND) | C5 VSS (GROUND) |
| C6 VPP (PROGRAMMING VOLTAGE) | C6 MCLK, SWP (Multi Function Interface) |
| C7 I/O (DATA INPUT/OUTPUT) | C7 I/O (DATA INPUT/OUTPUT) |
| C8 RESERVE | C8 MCMD, D− (Multi Function Interface) |

Referring to Table 2, a SIM card 100 according to some embodiments uses the contact pads C1, C2, C3, C5, and C7 in accordance with the ISO 7816 protocol. However, the SIM card 100 also uses the contact pads C4, C6, and C8, which are reserved or substantially not used by the ISO 7816 protocol, as I/O pads for a multi function interface. As a result, the SIM card 100 can provide various functions through a multi function interface without requiring additional contact pads.

For example, when the multi function interface is an MMC card interface, data MDATA0, a clock MCLK signal, and a command MCMD can be input to the contact pads C4, C6, and C8, respectively. When the multi function interface is a USB interface, data USB D+, a swap (SWP) signal, and data USB D− can be input to the contact pads C4, C6, and C8, respectively. Here, other combinations such as (C4, C6) and (C6, C8) can be used to receive data USB D+ and data USB D− instead of the combination (C4, C8). Furthermore, if necessary, all the three contact pads C4, C6, and C8 can be used as I/O pads for parallel data transmission.

Figure 2:
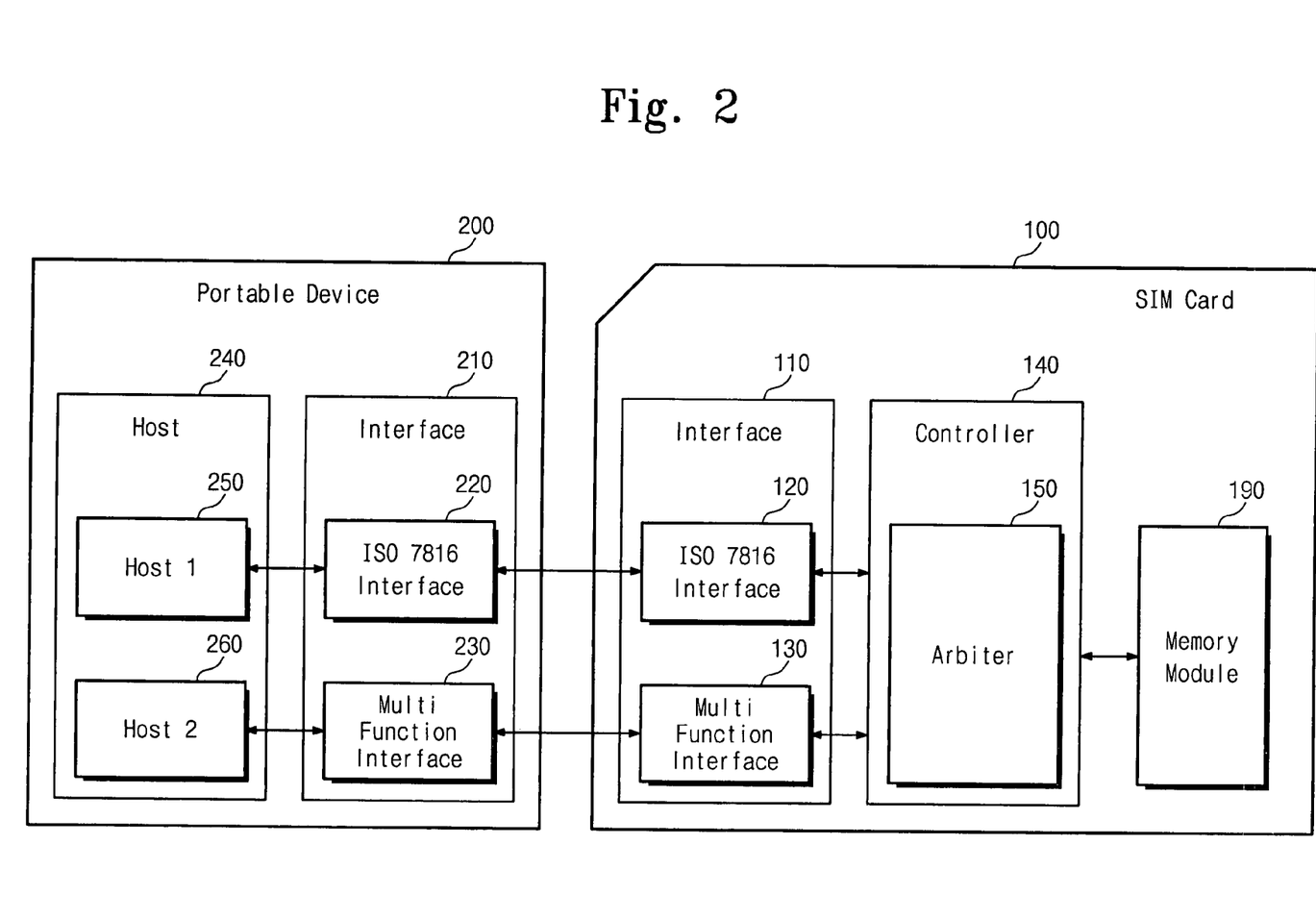
FIG. 2 is a block diagram illustrating some aspects of a SIM card and a portable device using the SIM card according to some embodiments of the present invention.

FIG. 2 is a block diagram illustrating an SIM card 100 and a portable device 200 using the SIM card 100 according to some embodiments of the present invention.

Referring to FIG. 2, the SIM card 100 includes an interface 110, a controller 140, and a memory module 190. The interface 110 includes an ISO 7816 interface 120 and a multi function interface 130. The ISO 7816 interface receives and transmits data using the contact pad C7 shown in FIG. 1 and Table 2. The multi function interface 130 receives and transmits data using the contact pads C4, C6, and/or C8. Functions of the contact pads C4, C6, and C8 used for the multi function interface 130 may be defined according to the type of the multi function interface 130 present. The type of interface function that the multi function interface 130 actually performs may be determined by using an output from a pad setting circuit 231 (refer to FIG. 4) connected to the contact pads C4, C6, and/or C8.

Instruction/data inputs through the ISO 7816 interface 120 and the multi function interface 130 are sent to the controller 140. The controller 140 includes an arbiter 150 that determines the priority between the instruction/data inputs from the ISO 7816 interface 120 and the multi function interface 130. The ISO 7816 interface 120 may be used primarily for identity certification functions, such as user authentication. The multi function interface 130 may be used for transmitting large amounts of data, such as audio files, video files, and/or DVD files, between the portable device 200 and the memory module 190.

The memory module 190 may include a read only memory (ROM), a random access memory (RAM), and/or an electrically erasable programmable read only memory (EEPROM) for application data. The memory module 190 may be used for various application operations of the SIM card 100. The ISO 7816 interface 120, which may be primarily used for user authentication as described above, can be used for data transmission between the portable device 200 and the memory module 190. Therefore, the arbiter 150 may determine priority for memory access as well as requests from the ISO 7816 interface 120 and the multi function interface 130.

Still referring to FIG. 2, the portable device 200 includes an interface 210 and a host 240.

The interface 210 includes an ISO 7816 interface 220 and a multi function interface 230. The host 240 may include first and second hosts 250 and 260 that respectively correspond to the ISO 7816 interface 220 and the multi function interface 230. The first host 250 exchanges data with the SIM card 100 using the ISO 7816 interface 110. The first host 250 and the SIM card 100 may communicate with each other using contact pads defined by the existing ISO 7816 protocol. The second host 260 exchanges data with the SIM card 100 using the multi function interface 230. The second host 260 and the SIM card 100 may communicate with each other using contact pads defined by the ISO 7816 protocol, and by assigning some of the contact pads C4, C6, and C8 to the multi function interface as shown in Table 2. The functions of the contact pads C4, C6, and C8 may be defined based on the type of interface function of the second host 250. For example, depending on the type of multi function interface function of the second host 250, the contact pads C4, C6, and C8 may be used as an instruction receiving pad, a data I/O pad, and/or a clock signal receiving pad. The specific functions of the contact pads C4, C6, and C8, which depend on the type of multi function interface involved, will be described below in more detail with reference to Tables 2 and 3 and FIGS. 4 and 5.

Figure 3:
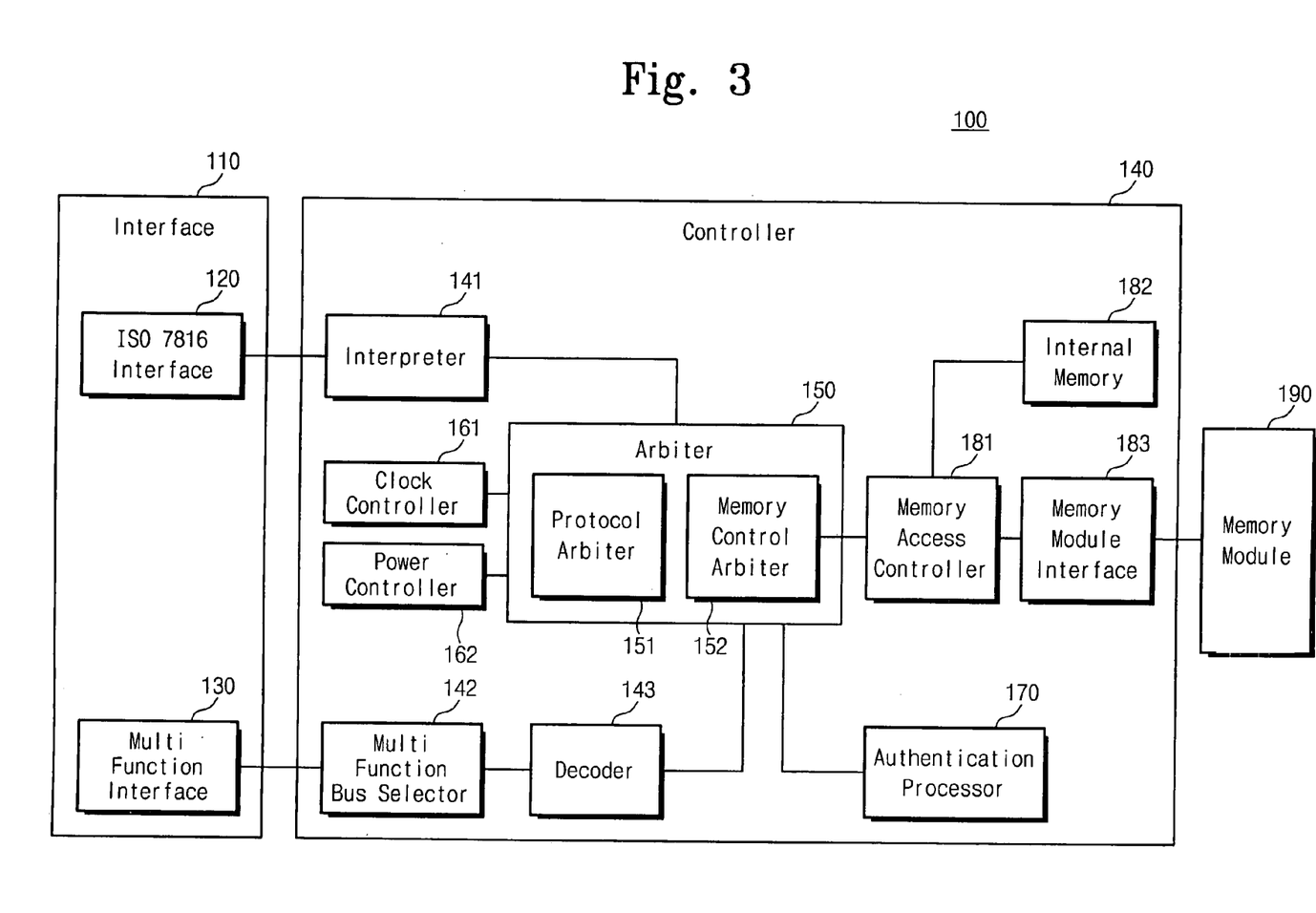
FIG. 3 is a detailed block diagram illustrating some aspects of the SIM card of FIG. 2 according to some embodiments of the present invention.

FIG. 3 is a detailed block diagram illustrating some aspects of the SIM card 100 of FIG. 2 according to some embodiments of the present invention. In particular, FIG. 3 illustrates the structure of the controller 140 of the SIM card 100 in more detail.

Referring to FIG. 3, the controller 140 includes an interpreter 141 that interprets instruction/data input from the ISO 7816 interface 120, a multi function bus selector 142 that receives instruction/data input from the multi function interface 130 and that detects and selects an interface scheme of the instruction/data, and a decoder 143 that decodes the instruction/data input from the multi function interface 130. The processed results of the interpreter 141 and the decoder 143 are sent to the arbiter 150.

The instruction/data input from the ISO 7816 interface 120 is usually used for identity certification functions, such as user authentication. In an ISO 7816 interface scheme for authentication, an authentication request should be processed in a predetermined time. Meanwhile, since large data files, such as audio files, video files, and/or DVD files, are transmitted through the multi function interface 130, a high data access rate should be provided for the multi function interface 130. According to some embodiments of the present invention, the SIM card 100 may provide at least two interface methods having different operational characteristics. For this purpose, separate data passages are provided for the respective ISO 7816 interface 120 and the multi function interface 130, and priority between the separate data passages may be determined by the arbiter 150. The multi function interface 130 according to some embodiments of the present invention uses some contact pads C4, 6C, and C8 of the existing contact pads under the ISO 7816 protocol without requiring additional contact pads.

Still referring to FIG. 3, the arbiter 150 is connected to a clock controller 161, a power controller 162, an authentication processor 170, and a memory access controller 181, in addition to the interpreter 141 and the decoder 143. The clock controller 161 generates and controls a clock signal for use in an interfacing operation of the SIM card 100. The power controller 162 manages power at a constant level for the SIM card 100. The authentication processor 170 contains an authentication algorithm for user authentication. That is, the authentication processor 170 is configured to process a user authentication request input from the ISO 7816 interface. The memory access controller 181 accesses an internal memory 182 embedded in the controller 140 and the memory module 190 connected to the controller 140.

The structure and operation of the arbiter 150 will now be described in more detail.

The arbiter 150 includes a protocol arbiter 151 and a memory control arbiter 152. The protocol arbiter 151 determines the process priority between instruction/data inputs from the ISO 7816 interface 120 and the multi function interface 130. For example, when the hosts 250 and 260 of the portable device 200 issue requests to the SIM card 100 at the same time, the protocol arbiter 151 determines and manages priority between the requests for performing simultaneous task or separate tasks. In some embodiments, the protocol arbiter 151 may give priority to the ISO 7816 interface 120 for processing an authentication operation using an instruction/data input from the ISO 7816 interface 120. The authentication operation is performed by the authentication processor 170. The authentication processor 170 may include various authentication algorithms in the form of hardware or software.

When the ISO 7816 interface 120 makes a requests for authentication while an instruction/data input from the multi function interface 130 is being processed, the protocol arbiter 151 may suspend the processing of the instruction/data input from the multi function interface 130 and may cause the authentication processor 170 to process the authentication request of the ISO 7816 interface 120. After processing of the authentication request is completed, the suspended process may be resumed and/or performed again from the beginning under the control of the protocol arbiter 151. For this purpose, the protocol arbiter 151 may include both hardware and/or software elements.

The memory control arbiter 152 determines priority between the ISO 7816 interface 120 and the multi function interface 130 when the ISO 7816 interface 120 and the multi function interface 130 request access to the internal memory 182 or the memory module 190. The memory control arbiter 152 determines and manages an order of priority between simultaneous access requests from the hosts 250 and 260 of the portable device 200. For this purpose, the memory control arbiter 152 may include both hardware and software elements.

The clock controller 161 generates and manages a clock signal for use in an interfacing operation of the SIM card 100. In the ISO 7816 protocol definition as shown in Table 2, a reference clock signal CLK having a frequency of 5 MHz or less is transmitted to the clock controller 161 through the contact pad C3. The clock controller 161 can use the CLK as a system clock signal of the SIM card 100 and/or can generate an independent system clock signal using an internal RC oscillator. The independent system clock signal generated using the internal RC oscillator may be used for interfacing operations for a USB and/or other devices such as an MMC, an SD card, a memory stick, a compact flash memory, an xD card, and/or an SM card. To provide a stable clock signal for at least two interfacing operations, the clock controller 161 may include clock source switching and managing functions. The clock controller 161 may include both hardware and/or software elements to perform those operations. As explained above, different clock signals can be used in the SIM card 100, since the SIM card 100 uses at least two interfacing methods having different characteristics.

The power controller 162 controls power for interfacing operations of the SIM card 100. According to the ISO 7816 protocol definition shown in Table 2, a power voltage VDD is applied through the contact pad C1, and a ground voltage VSS is applied through the contact pad C5. The power controller 162 attempts to maintain the power supply to the SIM card 100 at a stable level. When power to the SIM card 100 is randomly switched between on and off modes by the hosts 250 and 260, the power controller 162 reduces the resulting effects of on and off events. The power controller 162 may include both hardware and/or software elements to perform those operations.

The memory access controller 181 controls access to the internal memory 182 and the memory module 190 by the hosts 250 and 260 according to the access priority determined by the memory control arbiter 152. A memory module interface 183 is connected as a physical interface between the memory access controller 181 and the memory module 190.

As described above, according to some embodiments of the present invention, at least two interfacing methods having different characteristics may be used in the SIM card 100. For this purpose, the SIM card 100 may include separate data passages for the respective ISO 7816 interface and the multi function interface 130, and may determine priority between the data passages using the arbiter 150. In some embodiments of the present invention, the multi function interface 130 may operate using some contact pads C4, C6, and C8 of the existing contact pads defined by the ISO 7816 protocol without requiring additional contact pads.

Defined functions of the contact pads C4, C6, and C8 for a multi function interface and methods of recognizing the type of multi function interface that is present will now be described.

Figure 4:
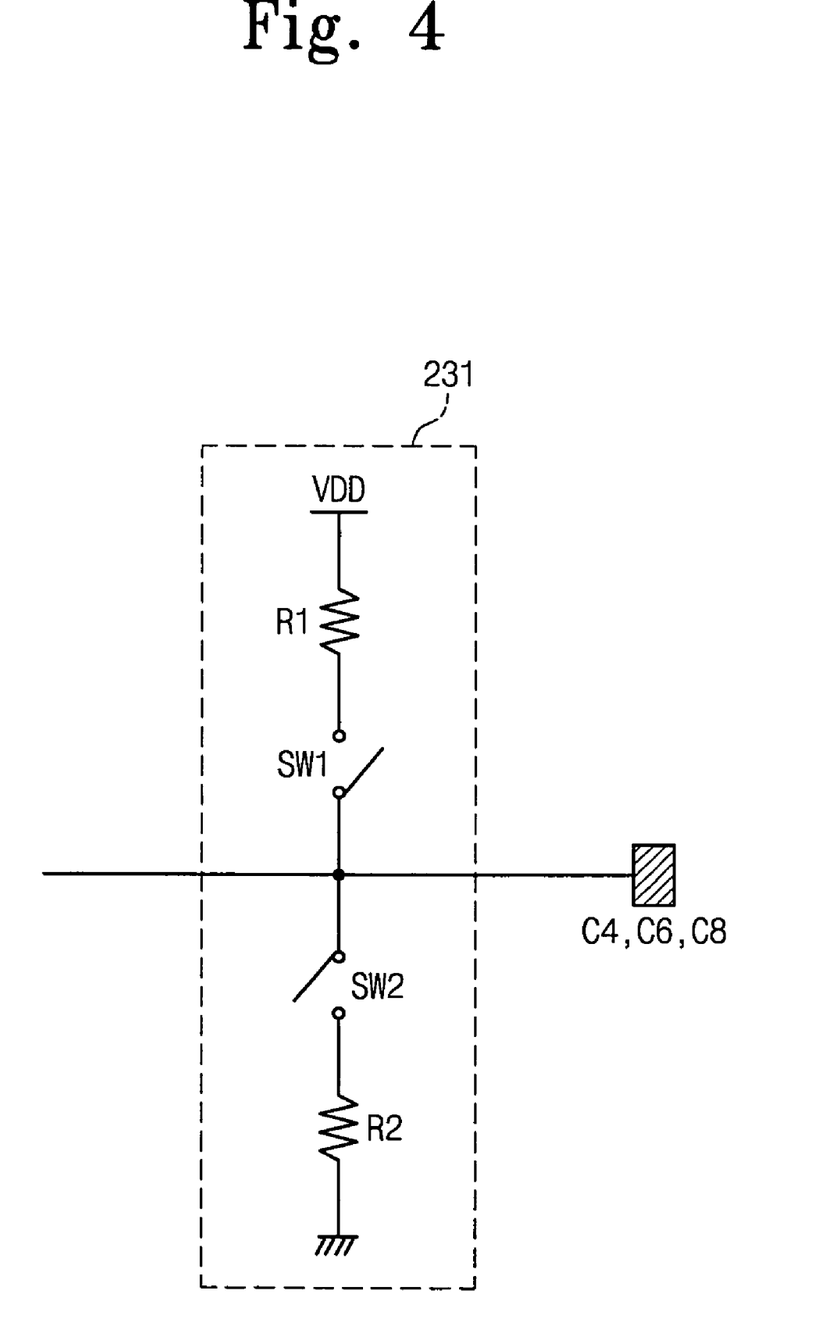
FIG. 4 is a circuit diagram illustrating a pad setting circuit for setting the functions of pads used for a multi function interface according to some embodiments of the present invention.

FIG. 4 is a circuit diagram illustrating a pad setting circuit 231 for setting the functions of contact pads C4, C6, and C8 used for a multi function interface according to some embodiments of the present invention. The pad setting circuit 231 may be provided in the multi function interface 230 of the portable device 200. Alternatively or additionally, the pad setting circuit 231 can be provided in the ISO 7816 interface 220 of the portable device 200.

Referring to FIG. 4, the pad setting circuit 231 includes a pull-up resistor R1 and a pull-up switch SW1 that are connected in series between a power voltage VDD and the contact pads C4, C6, and C8, and a pull-down resistor R2 and a pull-down switch SW2 that are connected in parallel between a ground point and the contact pads C4, C6, and C8. The pull-up resistor R1 may have a resistance of, for example, 50 KΩ to 100 KΩ, and the pull-down resistor R2 may have a resistance of, for example, 15 KΩ. The pull-up switch SW1 electrically connects the pull-up resistor R1 to the power voltage VDD, and the pull-down switch SW2 electrically connects the pull-down resistor R2 to the ground point. The functions of the contact pads C4, C6, and C8 are set according to switching operations of the pull-up and pull-down switches SW1 and SW2. The second host 260 may control the switching operations of the pull-up and pull-down switches SW1 and SW2 in accordance with a multi function interface scheme. An output of the pad setting circuit 231 is sent to a corresponding contact pad C4, C6, or C8.

Figure 5:
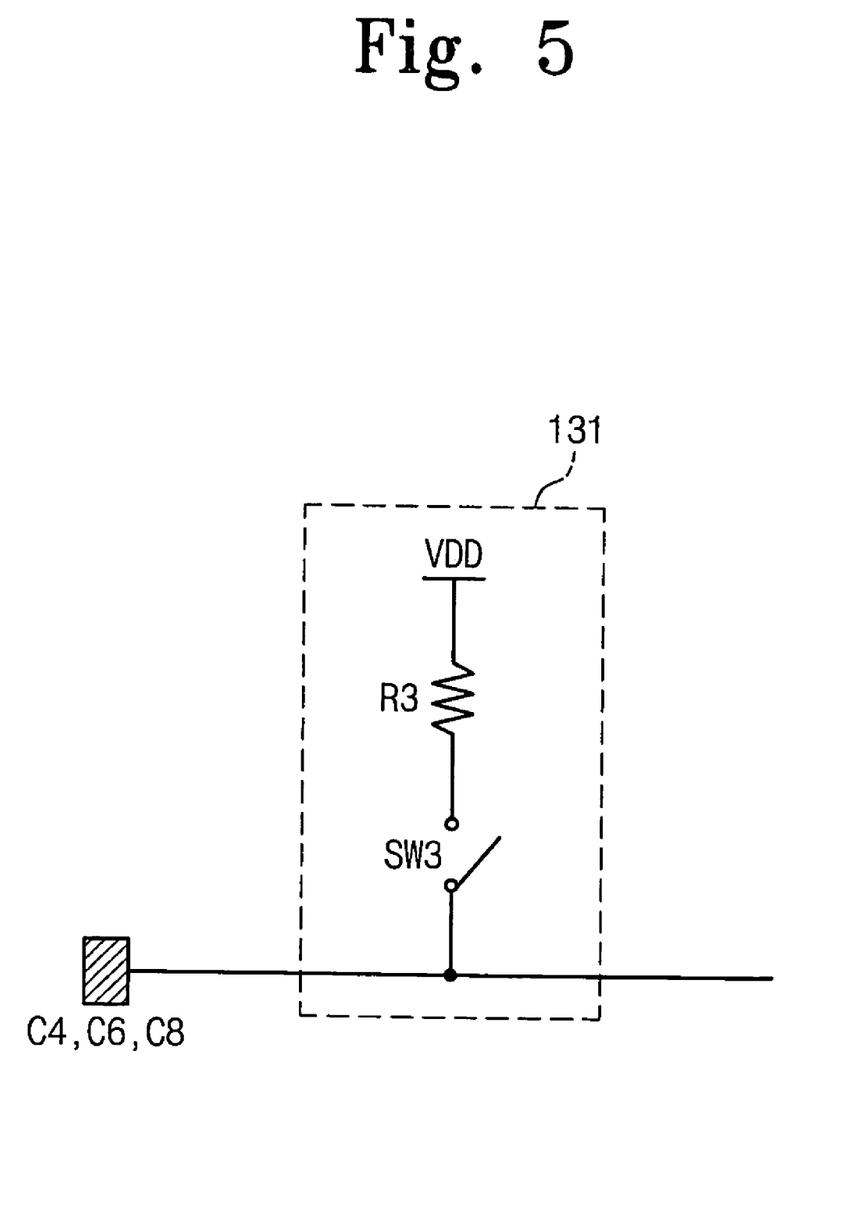
FIG. 5 is a circuit diagram illustrating a pad detecting circuit for detecting the functions of pads used for a multi function interface according to some embodiments of the present invention.

FIG. 5 is a circuit diagram illustrating a pad detecting circuit 131 for detecting the functions of contact pads C4, C6, and C8 used for a multi function interface according to some embodiments of the present invention. The pad detecting circuit 131 may be provided in the multi function interface 130 of the SIM card 100. Alternatively or additionally, the pad detecting circuit 131 can be provided in the ISO 7816 interface 120 of the SIM card 100.

Referring to FIG. 5, the pad detecting circuit 131 includes a pull-up resistor R3 and a pull-up switch SW3 that are connected in series between a power voltage VDD and the contact pads C4, C6, and C8. The pull-up resistor R3 may have a resistance of, for example, 1.5 KΩ. When the SIM card 100 is inserted into the portable device 200, the pull-up switch SW3 is turned on, such that signals can be transmitted from the contact pads C4, C6, and C8 to the multi function bus selector 142. The pad detecting circuit 131 includes the pull-up resistance R3 such that the signal levels from the contact pads C4, C6, and C8 can be precisely detected. In the embodiments of FIG. 5, the pad detecting circuit 131 is configured with the pull-up resistor R3 and the pull-up switch SW3. However, the pad detecting circuit 131 can have other configurations. For example, the pad detecting circuit 131 can be configured with a pull-down resistor and a pull-down switch.

The multi function bus selector 142 analyzes the functions of the contact pads C4, C6, and C8 using a high- or low-level signal input from the pad detecting circuit 131. The type of a multifunctional interfacing method to be used is determined according to the analysis results of the multi function bus selector 142. Information about the determined multifunctional interfacing method is stored in a multi-function select control register (not shown) provided in the multi function bus selector 142. According to the information stored in the multi-function select control register, a corresponding multifunctional interfacing method may be selected and activated.

Table 3 below shows settings for contact pads C1 through C8 according to a type of a multi function interface, and methods of recognizing the functions of the contact pads C1 through C8, according to some embodiments of the invention.

Table 3 shows settings of the contact pads C1 through C8 for the SIM card 100 to perform an ISO 7816 interfacing operation (e.g., SIM mode) and a multifunctional interfacing operation (e.g., MMC mode and USB mode), and methods of recognizing the functions of the contact pads C1 through C8 according to some embodiments of the present invention.

Referring to Table 3 and FIGS. 4 and 5, at least two interfacing methods having different characteristics may be used in the SIM card 100. For example, one of the at least two interfacing method may include an ISO 7816 interfacing method, and the other may include a multifunctional interfacing method such as MMC mode interfacing and/or USB mode interfacing. In SIM mode following the standard ISO 7816 protocol, the contact pads C4, C6, and C8 for multifunctional interfacing are set to a high-impedance state by a host, and the SIM card 100 establishes no connection to the contact pads C4, C6, and C8.

For operation in multi function mode, for example, in MMC mode, the contact pads C4 and C8 are connected to the pull-up resistor R1 having a resistance of 50 to 100 KΩ by the pad setting circuit 231 of the portable device 200, and a clock signal for the MMC mode is transmitted to the contact pad C6. In this case, the contact pads C2, C3, and C7 for the ISO 7816 interface may be set to a high-impedance state by a host, and the SIM card 100 may establish no connection (NC) to the contact pads C2, C3, and C7.

The pad detecting circuit 131 of the SIM card 100 detects the settings of the contact pads C4, C6, and C8. The detection results (having a high- or low-level format) of the pad detection circuit 131 are input to the multi function bus selector 142. When the detection results regarding the contact pads C4 and C8 are high, the multi function bus selector 142 recognizes that the current multi function interfacing operation is in MMC mode. The recognition result is stored in the multi function select control register, and data processing related to multi function interfacing is performed according to the value stored in the multi function select control register. In this case, the contact pad C4 is used as an input/output terminal for MMC-mode data MDATA0, the contact pad C6 is used as an input terminal for an MMC-mode clock signal MCLK, and the contact pad C8 is used as an input terminal for an MMC-

TABLE 3

| PIN # | SIM MODE | | MMC MODE | | USB MODE | |
|---|---|---|---|---|---|---|
| | HOST | CARD | HOST | CARD | HOST | CARD |
| C1 (VDD) | VDD | VDD | VDD | VDD | VDD | VDD |
| C2 (RST) | RST | Pull-Down (1M) | High-Z | NC | High-Z | NC |
| C3 (CLK) | CLK | INPUT | High-Z | NC | High-Z | NC |
| C4 (MDATA0, D+) | High-Z | NC | Pull-Up (50-100K) | INPUT | Pull-Down (15K) | Pull-Down (1.5K) |
| C5 (VSS) | VSS | VSS | VSS | VSS | VSS | VSS |
| C6 (MCLK, SWP) | High-Z | NC | MCLK | INPUT | Pull-Down | INPUT |
| C7 (SIO) | SIO | Pull-UP | High-Z | NC | High-Z | NC |
| C8 (MCMD, D−) | High-Z | NC | Pull-Up (4.7-100K) | INPUT | Pull-Down (15K) | INPUT | mode command. If there is no response to a command signal input in a predetermined time (for example, one second), the multi function bus selector 142 may analyze detection results of the pad detecting circuit 131 again and update the value stored in the multi function select control register.

Meanwhile, for operation in USB mode, all the contact pads C4, C6 and C8 may be connected to the pull-down resistor R2 having a resistance of 15 KΩ by the pad setting circuit 231 of the portable device 200. In this case, the contact pads C2, C3, and C7 for the ISO 7816 interface may be set to a high-impedance state by a host, and the SIM card 100 may establish no connection to the contact pads C2, C3, and C7.

The pad detecting circuit 131 of the SIM card 100 is configured to detect the settings of the contact pads C4, C6, and C8. The detection results (having a high- or low-level format) of the pad detection circuit 131 are input to the multi function bus selector 142. If all the detection results are low, the multi function bus selector 142 recognizes that the current multi-functional interfacing operation is in USB mode.

The recognition result is stored in the multi function select control register, and data processing related to multi function interfacing is performed according to the value stored in the multi function select control register. In this case, the contact pad C4 is used as an input/output terminal for USB-mode data D+, the contact pad C6 is used as an input terminal for an USB-mode SWP signal, and the contact pad C8 is used as an input/output terminal for USB-mode data D−.

If inputs from the contact pads C4 and C8 are low for a predetermined time (for example, 3 ms), the SIM card 100 operates in the USB mode. If the inputs from the contact pads C4 and C8 are not in the low state for a predetermined time (for example, 3 ms), the multi function bus selector 142 analyzes detection results of the pad detecting circuit 131 again and updates the value stored in the multi function select control register.

As described above, according to some embodiments of the present invention, the SIM card 100 and the portable device 200 may perform an multifunctional interfacing operation without requiring additional contact pads by assigning the contact pads C4, C6, and C8 of the existing ISO 7816 contact pads for the multi function interfacing operation. As a result, at least two interfacing methods having different characteristics can be used in the SIM card 100. Data streams of the respective interfacing methods are transmitted along separate data passages according to priority determined by the arbiter 150. Therefore, a single smart card can provide various functions without requiring additional contact pads.

That is, according to some embodiments of the present invention, various functions can be included in a single smart card without increasing the number of contact pads.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A smart card comprising:
    a first interface configured to perform a first type interfacing operation with a host using a plurality of contact pads defined by a contact type smart card protocol;
    a second interface configured to perform a second type interfacing operation with the host using a subset of the plurality of contact pads; and
    a controller configured to determine a priority between the first and second interfaces;
    wherein the first interface comprises an ISO 7816 interface;
    wherein the subset of contact pads comprises a reserve contact pad C4, a high-voltage contact pad C6 for programming, and a reserve pad C8 that are defined at the ISO 7816 interface;
    wherein the second interface comprises a pad detecting circuit configured to detect pull-up/pull-down states of the respective contact pads C4, C6, and C8;
    wherein the controller comprises a multi function bus selector configured to determine a type of the second interface using the detected pull-up/pull-down states of the contact pads C4, C6, and C8; and
    wherein the multi function bus selector is configured to recognize the second interface as a USB interface when all the contact pads C4, C6, and C8 are in a pull-down state.

2. The smart card of claim 1, wherein the second interface comprises an interface for one of an MMC (multi media card), an SD (secure digital) card, a memory stick, a compact flash memory, an xD card, an SM (smart media), and a USB (universal serial bus) device.

3. The smart card of claim 1, wherein the host comprises a pad setting circuit configured to set functions of the contact pads C4, C6, and C8 for the second interface.

4. The smart card of claim 3, wherein the pad setting circuit comprises a pull-up/pull-down circuit connecting the respective contact pads C4, C6, and C8 to a power voltage or a ground voltage.

5. The smart card of claim 4, wherein the multi function bus selector is configured to recognize the second interface as an MMC interface when both the contact pads C4 and C8 are in a pull-up state.

6. The smart card of claim 1, further comprising a memory module configured to store data transmitted through the first or second interfaces.

7. The smart card of claim 6, wherein the controller is configured to determine a priority between the first and second interfaces for access to the memory module.

8. A smart card system comprising:
    a portable device including a first host and a second host; and
    a smart card connecting to the portable device through a plurality of contact pads defined by a contact type smart card protocol,
    wherein the smart card further comprises:
    a first interface configured to perform a first type interfacing operation with the first host using the contact pads;
    a second interface configured to perform a second type interfacing operation with the second host using a subset of the contact pads; and
    a controller configured to determine a priority between the first and second interfaces;
    wherein the first interface comprises an ISO 7816 interface
    wherein the subset of contact pads comprise a reserve contact pad C4, a high-voltage contact pad C6 for programming, and a reserve pad C8 that are defined at the ISO 7816 interface;
    wherein the second interface comprises a pad detecting circuit configured to detect pull-up/pull-down states of the respective contact pads C4, C6, and C8;
    wherein the controller comprises a multi function bus selector configured to determine a type of the second interface using the detected pull-up/pull-down states of the contact pads C4, C6, and C8; and wherein the multi function bus selector is further configured to recognize the second interface as a USB interface when all the contact pads C4, C6, and C8 are in a pull-down state.

9. The smart card system of claim 8, wherein the second interface comprises an interface for one of an MMC (multi media card), an SD (secure digital) card, a memory stick, a compact flash memory, an xD card, an SM (smart media), and a USB (universal serial bus) device.

10. The smart card system of claim 8, wherein the second host comprises a pad setting circuit setting functions of the contact pads C4, C6, and C8 for the second interface.

11. The smart card system of claim 10, wherein the pad setting circuit is a pull-up/pull-down circuit connecting the respective contact pads C4, C6, and C8 to a power voltage or a ground voltage.

12. The smart card system of claim 11, wherein the multi function bus selector is further configured to recognize the second interface as an MMC interface when both the contact pads C4 and C8 are in a pull-up state.

13. The smart card system of claim 8, further comprising a memory module configured to store data transmitted through the first and second interfaces.

14. The smart card system of claim 13, wherein the controller is configured to determine priority between the first and second interfaces for the memory module.

15. A smart card, comprising:
a first interface configured to perform a first type of interfacing operation with a host using a plurality of contact pads defined by a contact type smart card protocol;
a second interface configured to perform a USB interfacing operation with the host using a subset of the plurality of contact pads; and
a controller configured to determine a priority between the first and second interfaces;
wherein the subset of contact pads comprises a reserve contact pad C4, a high-voltage contact pad C6 for programming, and a reserve pad C8 that are defined at the first interface; and
wherein the multi function bus selector is configured to recognize the second interface as the USB interface when all the contact pads C4, C6, and C8 are in a pull-down state.

* * * * *